United States Patent Office 3,377,180
Patented Apr. 9, 1968

3,377,180
SOIL STABILIZATION PRODUCT
Keith E. James, Houston, Tex., assignor to The Procter & Gamble Company, Cincinnati, Ohio, a corporation of Ohio
No Drawing. Filed Dec. 16, 1965, Ser. No. 514,389
5 Claims. (Cl. 106—287)

ABSTRACT OF THE DISCLOSURE

An improved grouting material for treating clay-sensitive soil containing from .05% to 50% of specified amine oxide detergent, at least about ¼% sodium chloride or calcium chloride, up to 30% lime, cement, or mixtures thereof, and the balance water; process for stabilizing clay-sensitive soil comprising saturating said soil with said grouting material.

---

This invention relates to a product and a process for promoting dimensional soil stability in sensitive clay-bearing soils.

In many sections of the country the soil, e.g., clay, is dimensionally unstable. This dimensionally unstable (expansive clay; clay-sensitive) soil tends to absorb water and swell, thereby causing "heaving" and "buckling" of the ground. This behavior of the clay-sensitive soil is clearly undesirable when one wishes to build structures on top of the ground. The "heaving" of the soil tends to damage the building on top of the ground. Furthermore, the soil does not have sufficient resistance to compressive forces to hold the weight of buildings.

It has been suggested that cement or lime can be injected into the soil to promote dimensional stability. This is usually done in combination with a surfactant. However, the methods which have been used heretofore have not been very effective.

It is an object of this invention to provide a product, suitable for injection into clay-sensitive soils, which will promote dimensional soil stability.

It is a further object of this invention to provide a process for treating clay-sensitive soil to promote dimensional soil stability.

The above objects and other objects which will hereinafter be apparent can be achieved by providing an improved grouting material for treating clay-sensitive soil to promote its dimensional stability consisting essentially of:

(1) From about .05% to about 50% of a detergent having the formula

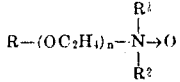

wherein R is an alkyl group containing from about 10 to about 18 carbon atoms, $R^1$ and $R^2$ are each selected from the group consisting of short alkyl chains and short alkanol chains containing from about 1 to about 3 carbon atoms and $n$ is a number ranging from 0 to about 6;

(2) From about ¼% to saturation of an electrolyte selected from the group consisting of sodium chloride and calcium chloride;

(3) Up to about 30% of a grouting agent selected from the group consisting of lime, cement and mixtures thereof;

(4) Up to about 16% of a compatibilizing solvent selected from the group consisting of ethyl alcohol, methyl alcohol and ethylene glycol; and (5) The balance water.

The above composition is effective in promoting the dimensional stability of clay-sensitive soils when injected into said soil.

The grouting agent is normally used at a level of at least 0.1% and preferably from about 0.3% to about 0.6% by weight of the grouting material. This concentration range corresponds to a range from the saturation point of the agent in the material to twice the amount needed to saturate the grouting material with the agent. More grouting agent is normally used only when more water is added later, or when there is a chance of substantial ground water being encountered. The grouting agent, in combination with the other components of the grouting material, serves to strengthen the soil and increase its ability to withstand pressure from, e.g., buildings which rest on top of the soil.

The electrolyte is an especially important component in the above grouting material. The electrolyte apparently ties up clay and prevents the clay from hydrating in the presence of water. It is this hydration of, e.g., clay which causes it to swell and heave. The preferred electrolyte is sodium chloride because it is relatively inexpensive and effective. Although higher levels of electrolyte are generally preferred, the low levels, e.g., about ½% by weight in the grouting material have been shown to be effective.

The detergent is also an important component of the above grouting material. The grouting agent and the electrolyte are ineffective unless they are spread throughout the soil and the detergent promotes the migration of the grouting agent and the electrolyte through the soil. Very few detergents are effective in the presence of the electrolyte but the detergent of this invention is exceptionally effective in the presence of the electrolyte. Although high levels of detergent can be used, it is preferred to use lower levels in the material, e.g., from about 0.2% to about 1% detergent by weight.

The water is the principal solvent which carries the grouting agent and the electrolyte through the soil. The water also tends to hydrate the soil but this hydration is inhibited by the presence of the electrolyte.

The compatibilizing solvent is added in an amount required to provide the desired grouting material, compatibility and viscosity, i.e., relatively uniform consistency and flowability into the soil.

The compatibilizing solvent is used primarily when there is a large amount of detergent present in the material as when, e.g., one intends to add additional water later. The compatibilizing solvent is an optional ingredient at the preferred lower concentrations of detergent.

The above grouting material is used in a process for stabilizing clay-sensitive soil which comprises contacting, e.g., injecting, the material into a clay-sensitive soil. Because of the effectiveness of the detergent the number of contacts, e.g., injections, required in a given area is minimized and/or the time required to treat the soil is reduced as compared to prior art techniques.

Several methods of injecting the grouting material into a clay-sensitive soil can be used. The material is preferably in the form of a uniform slurry. One technique involves forming a pond of the above material over the site which is to be stabilized and allowing the natural seepage to carry the water and grouting material into the soil. An improved method based upon this ponding technique involves preparing a maze or cross trenches and introducing the above material into said trenches from whence the material seeps into the surrounding ground carrying the grouting agent and the electrolyte through the soil. Another variation involves drilling a number of holes at spaced intervals through the area to be stabilized and introducing the grouting material into these drill holes from whence the grouting material seeps out into the surrounding soil. Additional water, detergent, and/or electrolyte can be added if desired in each technique.

The rate of application to the soil depends upon several variables such as the weight of the structure which is to be placed on top of the soil, the type of structure which is to be placed on top of the soil, the depth of the clay-sensitive soil stratum, etc. In general, however, one adds as much of the grouting material to the soil as it will absorb. Therefore, the amount of material added to the soil is from about 5% to about 100% by weight of the maximum amount of material the clay-sensitive soil will absorb. The rate of absorption and the amount of time which is available for stabilizing the soil will determine the number of points at which the material is introduced into the clay-sensitive soil. As an example, 10 or more pounds of, e.g., lime per square yard can be introduced into the soil.

The amount of material which has been introduced into the soil can be determined by taking core samples at varying distances from the points of injection of the material and/or by determining the moisture level in the ground at a specified distance from the point of injection. The rate at which water seeps into the ground is roughly proportional to the rate at which the, e.g., lime is carried through the soil.

A similar process can be utilized in which a prepared product is not used. In this process the grouting agent is introduced into the pond, ditch or hole and an aqueous solution of detergent and electrolyte is added on top of the grouting material. The water which is added would then contain from about 0.05% to about 50% of the detergent hereinbefore described and from about ¼% to saturation of the electrolyte hereinbefore described. The amount of water added is preferably sufficient to dissolve the grouting agent.

All parts, ratios and percentages herein are by weight unless otherwise specified.

The following example illustrates the practice of the invention.

EXAMPLE

The following compositions are useful in the practice of this invention.

|  | 1 | 2 |
| --- | --- | --- |
|  | Percent | Percent |
| Coconut alkyl* dimethyl amine oxide | 22.5 | 0.3 |
| Sodium chloride | 10 | 0.5 |
| Lime | 10 | 0.5 |
| Ethyl alcohol | 16 | 0.0 |
| Water | Balance | Balance |

* Coconut alkyl as used herein refers to a chain length distribution as follows: 2% $C_{10}$; 66% $C_{12}$; 23% $C_{14}$; and 9% $C_{16}$.

When the above compositions are applied to a clay-sensitive soil by digging a maze of cross trenches about six inches wide, sufficiently deep to reach the clay-sensitive soil, and about ten feet apart in at least one direction and thereafter placing in said trenches sufficient amounts of the above compositions to saturate the clay-sensitive soil, the clay-sensitive soil is stabilized.

When in the above example the following amine oxide detergents are substituted either wholly or in part (e.g., a 1:1 mixture) for the coconut alkyl dimethyl amine oxide, substantially equivalent results are obtained in that the soil is stabilized.

dimethyldodecylamine oxide;
dimethyltetradecylamine oxide;
ethylmethyltetradecylamine oxide;
cetyldimethylamine oxide;
dimethylstearylamine oxide;
cetylethylpropylamine oxide;
diethyldodecylamine oxide;
diethyltetradecylamine oxide;
dipropyldodecylamine oxide;
bis-(2-hydroxyethyl)dodecylamine oxide;
bis-(2-hydroxyethyl)-2-dodecoxy-ethyl amine oxide;
(2-hydroxypropyl)methyltetradecylamine oxide;
dimethyloleylamine oxide;

and the corresponding decyl, hexadecyl and octadecyl homologs of the above compounds.

When in the above example, cement is substituted either wholly or in part (e.g., a 1:1 mixture of lime and cement) for the lime, substantially equivalent results are obtained in that the clay-sensitive soil is stabilized.

When in the above example, calcium chloride is substituted either wholly or in part (e.g., a 1:1 mixture of NaCl and $CaCl_2$) for sodium chloride substantially equivalent results are obtained in that the clay-sensitive soil is stabilized.

What is claimed as new is:

1. An improved grouting material for treating clay-sensitive soil to promote its dimensional stability consisting essentially of:
   (a) From about .05% to about 50% of a detergent having the formula

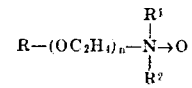

wherein R is an alkyl group containing from about 10 to about 18 carbon atoms, $R^1$ and $R^2$ are each selected from the group consisting of short alkyl chains and short alkanol chains containing from about 1 to about 3 carbon atoms and $n$ is a number ranging from 0 to about 6;
   (b) From about ¼% to saturation of an electrolyte selected from the group consisting of sodium chloride and calcium chloride;
   (c) Up to about 30% of a grouting agent selected from the group consisting of lime, cement and mixtures thereof; and
   (d) The balance water.

2. The process of stabilizing clay-sensitive soil comprising contacting clay-sensitive soil with the grouting material of claim 1 until the clay-sensitive soil is essentially saturated with said grouting material.

3. The grouting material of claim 1 wherein the surfactant is coconut dimethyl amine oxide.

4. The grouting material of claim 1 wherein the electrolyte is sodium chloride.

5. The grouting material of claim 1 containing as an additional component up to about 16% of a compatibilizing solvent selected from the group consisting of ethyl alcohol, methyl alcohol and ethylene glycol.

References Cited

UNITED STATES PATENTS

| 3,307,588 | 3/1967 | Hylak | 106—90 |
| 3,341,459 | 9/1967 | Davis | 252—137 |

ALEXANDER H. BRODMERKEL, Primary Examiner.

T. MORRIS, Assistant Examiner.